United States Patent [19]

Mitchell

[11] Patent Number: 4,793,416
[45] Date of Patent: Dec. 27, 1988

[54] ORGANIC CROSSLINKING OF POLYMERS FOR CO2 FLOODING PROFILE CONTROL

[75] Inventor: Thomas O. Mitchell, Pennington, N.J.

[73] Assignee: Mobile Oil Corporation, New York, N.Y.

[21] Appl. No.: 68,006

[22] Filed: Jun. 30, 1987

[51] Int. Cl.⁴ .................. E21B 33/138; E21B 43/16; E21B 43/20

[52] U.S. Cl. .................. 166/266; 166/270; 166/274; 166/295; 523/130

[58] Field of Search .............. 166/268, 270, 273, 274, 166/294, 295, 300, 266; 252/8.554; 405/264; 523/130

[56] References Cited

U.S. PATENT DOCUMENTS

| | | | |
|---|---|---|---|
| 3,243,000 | 3/1966 | Patton et al. | 175/65 |
| 3,305,016 | 2/1967 | Lindblom et al. | |
| 3,372,749 | 3/1968 | Williams. | |
| 3,373,810 | 3/1968 | Williams. | |
| 3,908,760 | 9/1975 | Clampitt et al. | 166/246 |
| 3,918,521 | 11/1975 | Snavely et al. | 166/272 |
| 4,157,322 | 6/1979 | Colegrove | 260/15 |
| 4,349,443 | 9/1982 | Block | 252/8.511 |
| 4,458,760 | 6/1984 | Hurd | 166/273 |
| 4,461,351 | 7/1984 | Falk | 166/295 |
| 4,479,894 | 10/1984 | Chen et al. | 252/8.554 |
| 4,489,783 | 12/1984 | Shu | 166/272 |
| 4,513,821 | 4/1985 | Shu | 166/273 |
| 4,529,037 | 7/1985 | Froning et al. | 166/268 X |
| 4,579,667 | 4/1986 | Echt et al. | 166/274 X |
| 4,658,898 | 4/1987 | Paul et al. | 166/270 |
| 4,673,038 | 6/1987 | Sandiford et al. | 166/270 |
| 4,716,966 | 1/1988 | Shu | 166/295 |

OTHER PUBLICATIONS

Hawley, Gessner G., *The Condensed Chemical Dictionary, Eighth Edition, 1971, pp. 912.*

*Primary Examiner*—George A. Suchfield
*Attorney, Agent, or Firm*—Alexander J. McKillop; Michael G. Gilman; Charles A. Malone

[57] ABSTRACT

A process for recovering hydrocarbonaceous fluids from a formation having a substantially low pH where a rehealable gel prepared ex-situ is used to close off a zone of greater permeability. Said gel is obtained by mixing into an aqueous medium sufficient biopolymer amounts of a Xanthan or Alcaligene polysaccharide. This mixture is maintained at a pH of about 5.5 while an aminoplast resin in excess of 4,000 ppm is added thereto which causes said gel to form in about 0.5 to 6 hours. The resultant gel is suitable for use in a carbon-dioxide flood process. Said gels are very stable at a pH of less than about 5.5.

31 Claims, 1 Drawing Sheet

ORGANIC CROSSLINKING OF POLYMERS FOR CO2 FLOODING PROFILE CONTROL

FIELD OF THE INVENTION

This invention relates to a process for recovering oil from a subterranean, oil-containing formation. More particularly, this invention relates to a method of recovering oil wherein a zone of greater permeability in said formation is closed by a novel gel and oil is subsequently displaced from a zone of lesser permeability by carbon dioxide.

BACKGROUND OF THE INVENTION

In the recovery of oil from oil-containing formations, it usually is possible to recover only minor portions of the original oil in-place by the so-called primary recovery methods which utilize only the natural forces present in the formation. Thus, a variety of supplemental recovery techniques have been employed in order to increase the recovery of oil from subterranean formations. These techniques include thermal recovery methods, waterflooding, and miscible flooding.

More recently, carbon dioxide has been used successfully as an oil recovery agent. Carbon dioxide is a particularly desirable material because it is highly soluble in oil, and dissolution of carbon dioxide in oil causes a reduction in the viscosity of the oil and an increase in the volume of oil, all of which improve the recovery efficiency of the process. Carbon dioxide is sometimes employed under non-miscible conditions. In certain reservoirs it is possible to achieve a condition of miscibility at reservoir temperature and pressure between carbon dioxide and the reservoir oil.

Where carbon dioxide is used in a formation having swept and unswept zones, the swept zone will create a situation where carbon dioxide does not contact oil contained in the unswept zone. The carbon dioxide thus has a tendency to overrride or bypass the unswept zone leaving behind oil contained in the unswept zone. Moreover, low pH conditions encountered in a carbon dioxide flood affect the long term stability of many agents used to divert carbon dioxide through an unswept zone.

To overcome this situation, a method is needed which will close pores in a substantially low pH swept zone which has been contacted with carbon dioxide and thereafter divert carbon dioxide to the unswept zone which has not been contacted so as to remove hydrocarbonaceous fluids therefrom.

SUMMARY OF THE INVENTION

The present invention is directed to a method for maximizing a fluid drive during the recovery of oil from a subterranean, oil-containing formation which formation has a substantially low pH. Said formation also has at least one high and one low permeability zone penetrated by at least one injection well and one production well. A cross linked polymer mixture is formed above ground. Said mixture comprises water, biopolymers of either Xanthan gums or microbial polysaccharides, and a melamine/formaldehyde resin in an amount greater than about 4,000 ppm. This mixture forms a rehealable gel at ambient temperature within about 0.5 to about six hours at a pH of about 5.5 or less. Said gel, being of a size and composition sufficient to selectively enter the high permeability zone, is injected into the formation. Pores are thereby closed in said high permeability zone wherein said gel reheals.

Thereafter, a drive fluid is injected into said formation in an amount and pressure sufficient to remove hydrocarbonaceous fluids from the zone of lesser permeability. Said drive fluid is prevented from entering the zone of greater permeability because of the gel's blocking action. Said gel is able to withstand the low pH conditions existing in the formation. Hydrocarbonaceous fluids and the drive fluid are removed from the low permeability zone via a production well.

It is therefore an object of this invention to provide for novel gels which can be used in low pH conditions encountered during a carbon dioxide flood.

It is another object of this invention to inject into a high permeability zone previously contacted with carbon dioxide, a rehealable gel capable of withstanding substantially low pH conditions which gel is formed ex-situ.

It is a further object of this invention to provide for an ex-situ formed rehealable gel suitable for profile control which gel is stable enough to impede flow for long time periods at the reservoir temperature, salinity, and pH.

It is a still further object of this invention to quickly make gels of greater stability.

It is a yet still further object of this invention to effect a cost savings by decreasing the volume of carbon dioxide required in a carbon dioxide sweep process.

It is a still yet further object of this invention to obtain increased yields of hydrocarbonaceous fluids.

DESCRIPTION OF THE PREFERRED EMBODIMENT

Figure 1:
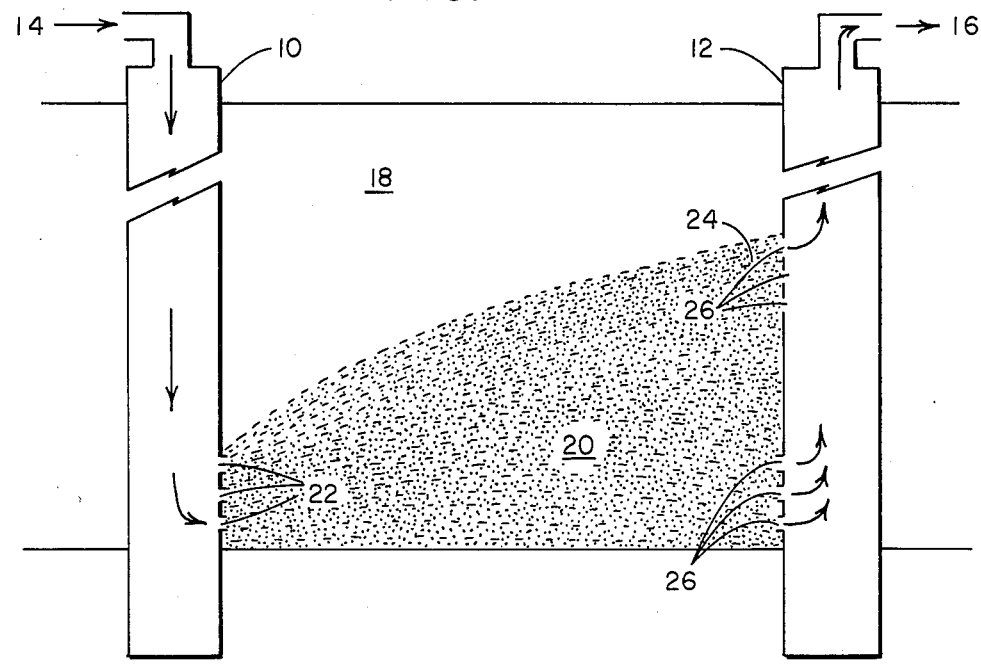
FIG. 1 is a schematic illustration showing swept and unswept zones of a formation penetrated by injection and production wells during a carbon dioxide sweep.

In the practice of this invention, a melamine formaldehyde ("MF") resin is formed as a reaction product of melamine and formaldehyde. Said resin is known as an aminoplast or amino resin which comprises a class of thermo-setting resins made by the reaction of an amine with an aldehyde. The resin may be partially alkylated. The resultant resin is reacted with a cross-linkable biopolymer in an aqueous medium under substantially low pH conditions and needs no catalyst. Said polymer comprises either a xanthan gum or a microbial polysaccharide. This reaction is preferably carried out at ambient conditions above ground or ex-situ. The rehealable gel resultant from said reaction can be used in the recovery of hydrocarbonaceous fluids from a formation containing same.

These gels are novel in that they form from said biopolymer and MF resin mixture within a substantially short time when the pH is less than about 5.5 and an amount of MF resin is used greater than about 4,000 ppm. Said gels are preformed above ground or ex-situ. After entering the formation these gels reheal thereby closing off a more permeable zone of a formation. These gels are therefore suitable for use in a formation where the pH is less than about 5.5. They are particularly useful in carbon dioxide flooding and can also be utilized in water or steam flooding. A method for making a kindred gel is discussed in U.S. Pat. No. 4,157,322 which issued to Colegrove on June 5, 1979. Unlike Colegrove, the instant gelation reaction is not catalyzed by a salt which is acid generating upon the application of heat. This patent is hereby incorporated by reference.

A MF resin which can be used is derived as a reaction product of melamine and formaldehyde. It has an amine/aldehyde molar ratio of between 1-6. A ratio of 3-6 is commonly found in commercial resins. The methylol group, $-CH_2OH$, is reactive to various functional groups such as $NH_2$, $-CONH_2$, $-OH$, $-SH$ and can also self-condense to form cured resins. Its preparation is convenient and well documented in preparative polymer manuals.

The melamine resin that is utilized in this invention can be a commercial product such as Cyanamid's Parez ® resins with the critical amine to aldehyde molar ratio increased by addition of aldehyde if necessary. Included among these melamine-formaldehyde (melamine) resins which are useful in this invention are the partially methylated resins and the hexamethoxymethyl resins (i.e., American Cyanamid's Parez, Cymel TM 373, Cymel 370, Cymel 303, and Cymel 380). The resin, however, has to be one that is soluble or dispersible in an aqueous medium. Other amino resins can also be used. Non-limiting examples are urea-formaldehyde, ethylene and propylene urea formaldehyde, and triazone, uron, and glyoxal amino resins. The amount of amine and aldehyde in the resins required for adequate gel formation is in the molar ratio of 1:6-1:30 amine to aldehyde. Polymer concentrations are from about 0.2 to about 5.0 wt. percent, preferably about 2,500 to about 6,000 ppm. Amino resins are preferred crosslinkers because they (1) are economical to use; (2) can be applied to a wide variety of polymers; (3) form thermally stable, brine tolerant gels stable at low pH; and (4) do not need an acid or base catalyst.

Biopolymers which can be used are those having functional groups such as $NH_2$, $-CONH_2$, $-OH$, $-SH$ can be gelled with amino resins. Some acceptable polymers include Kelco's S-130 biopolymer and Xanthan biopolymers. Polymers mentioned in U.S. Pat. No. 4,157,322, supra, may be utilized as long as those polymers contain the functional groups above mentioned. Polymer concentration in said gels range from about 0.1 to about 5.0 wt. percent. These polymer concentrations vary depending upon the molecular weight of polymer used. Lower molecular weight polymers require a higher polymer concentration to gel. A polymer concentration of about 0.2–5.0 wt. percent is preferred.

One biopolymer which can be used comprises a heteropolysaccharide produced by the action of bacteria of the genus Xanthomonas upon sugar, starches, and similar carbohydrates. Said polymer is well known and can be produced in accordance with known procedures. Preparation details can be found in U.S. Pat. No. 3,373,810 and references therein. This patent is hereby incorporated by reference. Additional information regarding Xanthomonas polysaccharides and their methods of preparation can be found in U.S. Pat. Nos. 3,305,016 and 3,243,000 issued to Lindblom et al and Patton et al, respectively. Both patents are hereby incorporated by reference. One form of this polysaccharide is Flocon biopolymer 4800 which is purchasable from Pfizer, Inc., New York, N.Y.

Another polysaccharide biopolymer which can be utilized herein is derived from the genus Alcaligenes. Its use in enhanced oil recovery is described in U.S. Pat. No. 3,372,749. This patent is hereby incorporated herein by reference. A source for this polysaccharide biopolymer is Kelco Col., San Diego, Calif. 92123. One useful polysaccharide is sold under the tradename Kelco S-130.

In the practice of this invention, a biopolymer polysaccharide is mixed above ground in substantially fresh water in an amount sufficient to form a gel at ambient temperature, e.g., about 75° F. It is preferred to use Flocon, Kelco S-130, and mixtures thereof as the biopolymer. The amount of biopolymer utilized can be about 0.2 to about 5.0 weight percent, preferably about 2,500 ppm to about 6,000 ppm. The pH of the mixture is maintained at about 5.5 or less.

Thereafter, a MF resin crosslinker is placed into said mixture in an amount of from about 4,000 ppm (0.4 wt.%) to about 1.0 wt.% The minimum amount of crosslinker should be no less than about 4,000 ppm. Maintaining this concentration provides for a gel which forms quickly above ground, i.e., within about 0.5 to about 6 hours. Further, said gel will have a substantially longer term of stability after shearing occurs when directing said gel into a desired formation. This gel is also more selective in entering the higher permeability areas of the formation or reservoir.

The order of mixing may be varied.

Examples of gels which can be utilized follow below:

| GELS FORMED AT 75° F. IN <4 HRS AT pH 3.5 (all in distilled water) |
| --- |
| Stable Unsheared at 175° F. for 6 Months |
| Stable after Shearing at 140° F. for 6 Months |
| 1000 ppm Flocon |
| 4000 ppm S-130 |
| 4000 ppm Parez 613 |
| 3000 or 5000 ppm Flocon |
| 4000 ppm Parez 613 |
| 5000 ppm S-130 |
| 4000 ppm Parez 613 |
| Stable Unsheared at 175° F. for 6 Months |
| Stability after Shearing not Checked |
| 600 ppm Flocon |
| 2000 ppm S-130 |
| 4000 ppm Parez 613 |
| 4000 ppm S-130 |
| 4000 ppm Parez 613 |
| Under Study Sheared and Unsheared |
| Stable at 175° F. for 10 weeks or longer |
| 3000 ppm Flocon |
| 2000 ppm Formaldehyde |
| 4000 ppm Parez 613 |

Listed below are examples of gels which did not form using other concentrations, salinities and pH ranges.

| GELS UNFORMED IN <24 HOURS AT 75° F. (all in distilled water) |
| --- |
| 4000 ppm Flocon |
| 4000 ppm S-130 |
| 4000 ppm Parez 613 |
| (pH 7) |
| 2000 ppm Flocon |
| 3000 ppm S-130 |
| 4000 ppm Parez 613 |
| 100 ppm Cr |
| (pH 7; others below are pH 3.5) |
| 5000 ppm Flocon |
| 2000 ppm Parez 613 |
| 5000 ppm S-130 |
| 2000 ppm Parez 613 |

-continued

| GELS UNFORMED IN <24 HOURS AT 75° F. |
| --- |
| (all in distilled water) |
| 5000 ppm S-130 |
| 1000 ppm resorcinol |
| 1800 ppm formaldehyde |
| 5000 ppm Flocon |
| 1000 ppm resorcinol |
| 1800 ppm formaldehyde |

| GELS UNFORMED IN <6 HOURS AT 75° F. |
| --- |
| (in 6% brine at pH 3.5) |
| 5000 ppm Flocon |
| 4000 ppm Parez 613 |
| 3500 ppm Flocon or S-130 |
| 2000 ppm Parez 613 |
| 2000 ppm formaldehyde |
| 5000 ppm partially hydrolyzed Hoechst V3140 |
| 4000 ppm Parez 613 |
| (in distilled water) |

| GELS UNSTABLE AT 140° F. AFTER GELLING AND SHEARING AT 75° F. |
| --- |
| (at pH 3.5; some gel times also over 6 hours) |
| 3500 ppm Flocon or S-130 |
| 3000 ppm Parez 613 |
| (in sea water) |
| 3500 ppm Flocon or S-130 |
| 2000 ppm Parez 613 |
| 2000 ppm formaldehyde |
| (in sea water) |
| 3000 ppm Flocon |
| 4000 ppm Parez 613 |
| 2000 ppm formaldehyde |
| (in 12% brine) |

Where it is desired to obtain increased sweep efficiency, gels of this invention can be used to plug a previously swept portion of a formation. Said gels can be directed to areas of increased porosity by utilization in any of the below methods.

One method where gels of this invention can be utilized is during a waterflooding process for the recovery of oil from a subterranean formation. After plugging the more permeable zones of a reservoir with the novel gels of this invention, a waterflooding process can be resumed or commenced. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Novel gels disclosed herein can be used in the recovery of hydrocarbonaceous fluids from an underground reservoir where a carbon dioxide oil recovery process is utilized. A carbon dioxide process which can be used is disclosed in U.S. Pat. No. 4,513,821 which issued to W. R. Shu on Apr. 30, 1985 and which is hereby incorporated by reference.

As shown in FIG. 1, injection well 10 penetrates a hydrocarbonaceous fluid bearing formation containing unswept zone 18 and swept zone 20 thereby creating a carbon dioxide override or bypass situation. Carbon dioxide enters injection well 10 via line 14 and proceeds into swept zone 20 by perforations 22 in injection well 10. The carbon dioxide becomes miscible with hydrocarbonaceous fluids in swept zone 20. Resultant hydrocarbonaceous fluids from zone 20 are combined with carbon dioxide and exit zone 20 via perforations 26 into production well 12 into line 16 where said fluids and carbon dioxide are separated and recovered.

Once recovery of hydrocarbonaceous fluids from swept zone 20 has been terminated, the inventive gel is injected into injection well 10 via line 14. Said gel enters swept zone 20 via perforations 22. By using a core sample obtained from zone 20 as an indicator of pore size within said zone, said gel, which is formed ex-situ, is allowed to become a size or nature sufficient to plug pores in swept zone 20. After said gel has penetrated into and closed the pores in zone 20, said gel is allowed to solidify. Behavior of gels in permeable zones of a formation is also discussed in U.S. Pat. No. 3,908,760 issued to Clampitt et al. on Sept. 30, 1975. This patent is hereby incorporated by reference.

Figure 2:
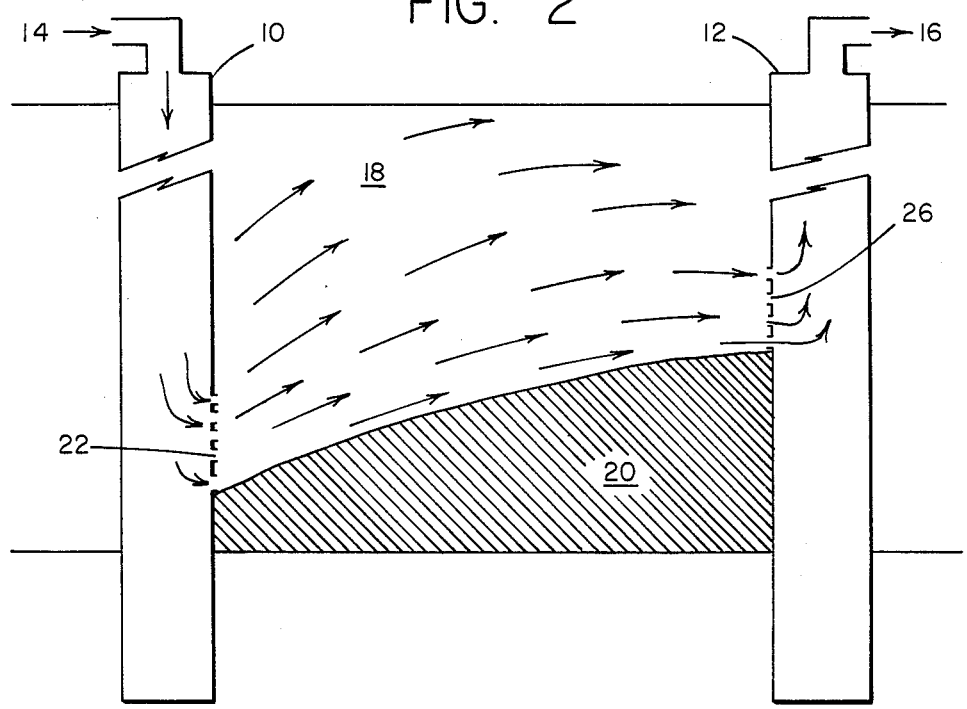
FIG. 2 is a schematic illustration where the carbon dioxide swept zone has been closed by a gel and hydrocarbonaceous fluids are removed from a previously unswept zone.

After gellation, carbon dioxide is injected into injection well 10 via line 14 where via perforations 22 it enters bypassed zone 18 which contains hydrocarbonaceous fluids. This process is shown in FIG. 2. Carbon dioxide becomes miscible with said fluids in unswept zone 18. Said fluids and carbon dioxide are then removed from zone 20 via perforations 26 into production well 12. Here, said fluids and carbon dioxide are removed from production well 12 via line 16. After exiting line 16, said fluids and carbon dioxide are separated and recovered. Recovered carbon dioxide can be recycled into said formation to recover additional hydrocarbonaceous fluids.

Another use for these novel gels is in profile control during a carbon dioxide flooding operation. After completing a carbon dioxide flooding operation, the more permeable zone of a multi-zone formation will have substantially all hydrocarbonaceous fluids removed. Hydrocarbonaceous fluids still remain in the area of lesser permeability. These novel gels can be used to effectively close a zone of greater permeability. Once the zone of greater permeability is closed, a carbon dioxide flood can be used to remove hydrocarbonaceous fluids from the zone of lesser permeability. Liquid carbon dioxide can be used as a drive fluid. Hurd discusses profile control in U.S. Pat. No. 4,458,760 which issued on July 10, 1984. This patent is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for recovering hydrocarbonaceous fluids from a formation having a substantially low pH, penetrated by at least one injection well and fluidly communicating with at least one production well which formation contains a low permeability and a high permeability zone comprising:
   (a) mixing together above ground, water, a biopolymer selected from the group consisting of Xanthan polysaccharides, Alcaligene polysaccharides, and mixtures thereof in an amount of about 0.2 to about 5.0 weight percent;

(b) maintaining said mixture at a pH of less than about 5.5;
(c) adding only sufficient aminoplast resin as a crosslinker to form a rehealable gel which forms in about 0.5 to about 6.0 hours at ambient temperature and which is of a size sufficient to selectively close pores in said high permeability zone;
(d) injecting via said injection well into said high permeability zone said gel in an amount sufficient to selectively close pores in said high permeability zone;
(e) injecting via said injection well into said low permeability zone a drive fluid in an amount sufficient to remove hydrocarbonaceous fluids from said low permeability zone which fluid is diverted from said high permeability zone containing said closed pores; and
(f) recovering hydrocarbonaceous fluids and the drive fluid from said low permeability zone via said production well.

2. The method as recited in claim 1 where the pH of said low and high permeability zones is less than about 5.5.

3. The method as recited in claim 1 where in step (a) said aminoplast resin crosslinker contained in said mixture is greater than about 4,000 ppm and forms a gel within about 0.5 to about 6.0 hours at ambient temperature.

4. The method as recited in claim 1 where said drive fluid comprises water, liquid carbon dioxide, and gaseous carbon dioxide.

5. The method as recited in claim 1 where said polymer concentration is from about 0.25 to about 0.60 weight percent.

6. The method as recited in claim 1 where in step (b) said pH is about 3.5.

7. The method as recited in claim 1 where in step (c) said aminoplast resin is a member selected from the group consisting of melamine-formaldehyde, urea-formaldehyde, ethylene urea formaldehyde, propylene urea formaldehyde, triazone, uron, and glyoxal.

8. The method as recited in claim 1 where in step (a) said water is substantially fresh water.

9. The method as recited in claim 1 where said gel is formed at a temperature of about 75° C. and is stable after shearing at a temperature of about 140° F. for at least about 6 months.

10. A carbon dioxide fluid drive method for minimizing gravity override in a hydrocarbonaceous fluid bearing formation with a substantially low pH, penetrated by at least one injection well and fluidly communicating with at least one production well which formation contains a swept and an unswept zone comprising;
(a) mixing together above ground, water, a biopolymer selected from the group consisting of Xanthan polysaccharides, Alcaligene polysaccharides, and mixtures thereof in an amount of about 0.2 to about 5.0 weight percent;
(b) maintaining said mixture at a pH of less than about 5.5;
(c) adding only sufficient aminoplast resin as a crosslinker to form a rehealable gel which forms in about 0.5 to about 6.0 hours at ambient temperature and which is of a size and composition sufficient to selectively close pores in said swept zone;
(d) injecting via said injection well into said swept zone said gel under conditions sufficient to selectively close pores in said swept zone; and
(e) injecting via said injection well into said unswept zone carbon dioxide in an amount sufficient to remove hydrocarbonaceous fluids from said unswept zone which carbon dioxide is diverted from said swept zone containing said closed pores thereby removing hydrocarbonaceous fluids from the unswept zone via said production well.

11. The method as recited in claim 10 where the pH of said swept and unswept zones is less than about 5.5.

12. The method as recited in claim 10 where in step (a) said aminoplastic resin crosslinker contained in said mixture is greater than about 4,000 ppm and forms a gel within about 0.5 to about 6.0 hours at ambient temperature.

13. The method as recited in claim 10 where said drive fluid comprises liquid carbon dioxide, and gaseous carbon dioxide.

14. The method as recited in claim 10 where said polymer concentration is from about 0.25 to about 0.60 weight percent.

15. The method as recited in claim 10 where in step (b) said pH is about 3.5.

16. The method as recited in claim 10 where in step (c) said aminoplast resin is a member selected from the group consisting of melamine-formaldehyde, urea-formaldehyde, ethylene urea formaldehyde, propylene urea formaldehyde, triazone, uron, and glyoxal.

17. The method as recited in claim 10 where in step (a) said water is substantially fresh water.

18. The method as recited in claim 10 where said gel is formed at a temperature of about 75° C. and is stable after shearing at a temperature of about 140° F. for at least about 6 months.

19. The method as recited in claim 10 where in step (a) said gel is capable of withstanding an underground environment having a pH of less than about 3.5 and a temperature less than about 210° F. for at least about 6 months.

20. The method as recited in claim 10 where in step (e) carbon dioxide is removed along with the hydrocarbonaceous fluids, separated from said fluids, and subsequently reinjected into the unswept zone.

21. A carbon dioxide fluid drive method for recovering hydrocarbonaceous fluids from a subterranean, hydrocarbonaceous fluid bearing formation having a substantially low pH, at least one zone of low permeability, and at least one zone of high permeability comprising:
(a) mixing together above ground, water, a biopolymer selected from the group consisting of Xanthan polysaccharides, Alcaligene polysaccharides, and mixtures thereof in an amount of about 0.2 to about 5.0 weight percent;
(b) maintaining said mixture at a pH of less than about 5.5;
(c) adding only sufficient aminoplast resin as a crosslinker to form a rehealable gel which forms in about 0.5 to about 6.0 hours at ambient temperature and is of a size sufficient to selectively close pores in said high permeability zone;
(d) injecting via an injection well under conditions to selectively close pores in the high permeability zone said gel which is of a size and composition sufficient to close pores in said high permeability zone;
(e) thereafter injecting via said injection well into said low permeability zone liquid carbon dioxide in an amount sufficient to remove hydrocarbonaceous fluids from said low permeability zone containing said closed pores; and (f) recovering hydrocarbonaceous fluids and carbon dioxide from said low permeability zone via a production well.

22. The method as recited in claim 21 where in step (a) said aminoplast resin crosslinker contained in said mixture is greater than about 4,000 ppm and forms a gel within about 0.5 to about 6.0 hours at ambient temperature.

23. The method as recited in claim 21 where said polymer concentration is from about 0.25 to about 0.60 weight percent.

24. The method as recited in claim 21 wherein step (b) said pH is about 3.5.

25. The method as recited in claim 21 where in step (c) said aminoplast resin is a member selected from the group consisting of melamine-formaldehyde, urea-formaldehyde, ethylene urea formaldehyde, propylene urea formaldehyde, triazone, uron, and glyoxal.

26. The method as recited in claim 21 where in step (a) said water is substantially fresh water.

27. The method as recited in claim 21 where said gel is formed at a temperature of about 75° C. and is stable after shearing at a temperature of about 140° F. for at least about 6 months.

28. The method as recited in claim 21 where in step (a) said gel is capable of withstanding an underground environment having a pH of less than about 3.5 and a temperature less than about 210° F. for at least about 6 months.

29. A method for closing pores in a more permeable zone of a hydrocarbonaceous fluid bearing formation to obtain improved sweep efficiency prior to a carbon dioxide oil recovery operation wherein the process comprises injecting into the formation a gellable composition comprising:

(a) water; (b) a biopolymer selected from the group consisting of Xanthan polysaccharides, Alcaligene polysaccharides, and mixtures thereof in an amount of about 0.2 to about 5.0 weight percent where said water and biopolymer are maintained at a pH of less than about 5.5;

(c) only sufficient aminoplast resin as a crosslinker to form a rehealable gel which forms in about 0.5 to about 6.0 hours at ambient temperature and which is of a size and composition sufficient to selectively close pores in a more permeable zone of said formation.

30. The method as recited in claim 29 wherein said aminoplast resin crosslinker contained in said mixture is greater than about 4,000 ppm and forms a gel within about 0.5 to about 6.0 hours at ambient temperature.

31. The method as recited in claim 29 wherein said aminoplast resin is a member selected from the group consisting of melamine-formaldehyde, urea-formaldehyde, ethylene urea formaldehyde, propylene urea formaldehyde, triazone, uron, and glyoxal.

* * * * *